United States Patent
Hu et al.

(10) Patent No.: US 10,552,322 B2
(45) Date of Patent: Feb. 4, 2020

(54) THROTTLING WRITES WITH ASYNCHRONOUS FLUSHING

(71) Applicant: EMC IP Holding Company LLC, Hopkinton, MA (US)

(72) Inventors: Guoyu Hu, Beijing (CN); Shuo Lv, Beijing (CN); Qiaosheng Zhou, Beijing (CN); Congyue Gu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 275 days.

(21) Appl. No.: 15/815,313

(22) Filed: Nov. 16, 2017

(65) Prior Publication Data

US 2019/0129848 A1   May 2, 2019

(30) Foreign Application Priority Data

Oct. 30, 2017   (CN) .......................... 2017 1 1035869

(51) Int. Cl.
*G06F 12/0804*   (2016.01)
*G06F 12/02*   (2006.01)
(Continued)

(52) U.S. Cl.
CPC .......... *G06F 12/0804* (2013.01); *G06F 3/061* (2013.01); *G06F 3/064* (2013.01);
(Continued)

(58) Field of Classification Search
CPC ...... G06F 12/0804; G06F 3/061; G06F 3/064; G06F 3/0647; G06F 3/0656;
(Continued)

(56) References Cited

U.S. PATENT DOCUMENTS 5,666,532 A * 9/1997 Saks ...................... G06F 16/10
707/613
6,260,125 B1 * 7/2001 McDowell .......... G06F 11/2074
711/162

(Continued)

OTHER PUBLICATIONS

Bono, Jean-Pierre et al.; "Managing Data Cache for File System Realized Within a File," U.S. Appl. No. 14/752,484, filed Jun. 26, 2015.

(Continued)

*Primary Examiner* — Yaima Rigol
(74) *Attorney, Agent, or Firm* — BainwoodHuang

(57) ABSTRACT

Embodiments are directed to techniques for allowing a data storage system to be able to flush data to underlying storage when the bandwidth is high without excessively impacting the maximum latency. This may be accomplished by utilizing asynchronous flushing and by throttling incoming writes by preventing too many asynchronous flushes from happening when the amount of available cache space is too small. In addition, an improved system employing Copy on First Write (CoFW) may initiate write throttling only once the amount of available write cache drops below a dynamically-calculated threshold that accounts for an amount of space actually needed to store CoFW buffers. In addition, only a portion of the write caching process is placed under the protection of a mutex or a spinlock, allowing a significant portion of the write caching for any given write operation to be performed without needing the mutex or spinlock, allowing some increased parallelization.

18 Claims, 4 Drawing Sheets

(51) Int. Cl.
*G06F 12/0866* (2016.01)
*G06F 12/0891* (2016.01)
*G06F 9/52* (2006.01)
*G06F 3/06* (2006.01)

(52) U.S. Cl.
CPC .......... *G06F 3/0647* (2013.01); *G06F 3/0656* (2013.01); *G06F 3/0659* (2013.01); *G06F 9/526* (2013.01); *G06F 12/0246* (2013.01); *G06F 12/0866* (2013.01); *G06F 12/0891* (2013.01)

(58) Field of Classification Search
CPC .... G06F 3/0659; G06F 9/526; G06F 12/0246; G06F 12/0891
See application file for complete search history.

(56) References Cited

U.S. PATENT DOCUMENTS

| | | | |
|---|---|---|---|
| 6,493,837 B1 * | 12/2002 | Pang | G06F 11/3466 707/999.202 |
| 6,853,643 B1 * | 2/2005 | Hann | H04L 49/103 370/413 |
| 8,429,352 B2 * | 4/2013 | Sinclair | G06F 12/0246 707/813 |
| 9,201,802 B1 | 12/2015 | Armangau et al. | |
| 9,280,467 B1 | 3/2016 | Kanteti et al. | |
| 9,747,222 B1 | 8/2017 | Armangau et al. | |
| 9,916,244 B1 * | 3/2018 | Tolvanen | G06F 3/065 |
| 9,934,163 B1 | 4/2018 | Armangau et al. | |
| 2005/0066095 A1 * | 3/2005 | Mullick | G06F 16/1774 710/200 |
| 2014/0281121 A1 * | 9/2014 | Karamcheti | G06F 3/061 711/102 |

OTHER PUBLICATIONS

Bassov, Ivan et al.; "Compressing Data in Line Using Weighted Compression Budgets," U.S. Appl. No. 15/392,639, filed Dec. 28, 2016.

Armangau, Philippe et al.; "Avoiding Data-Log Bypass to Promote Inline Deduplication During Copies," U.S. Appl. No. 15/798,580, filed Oct. 31, 2017.

* cited by examiner

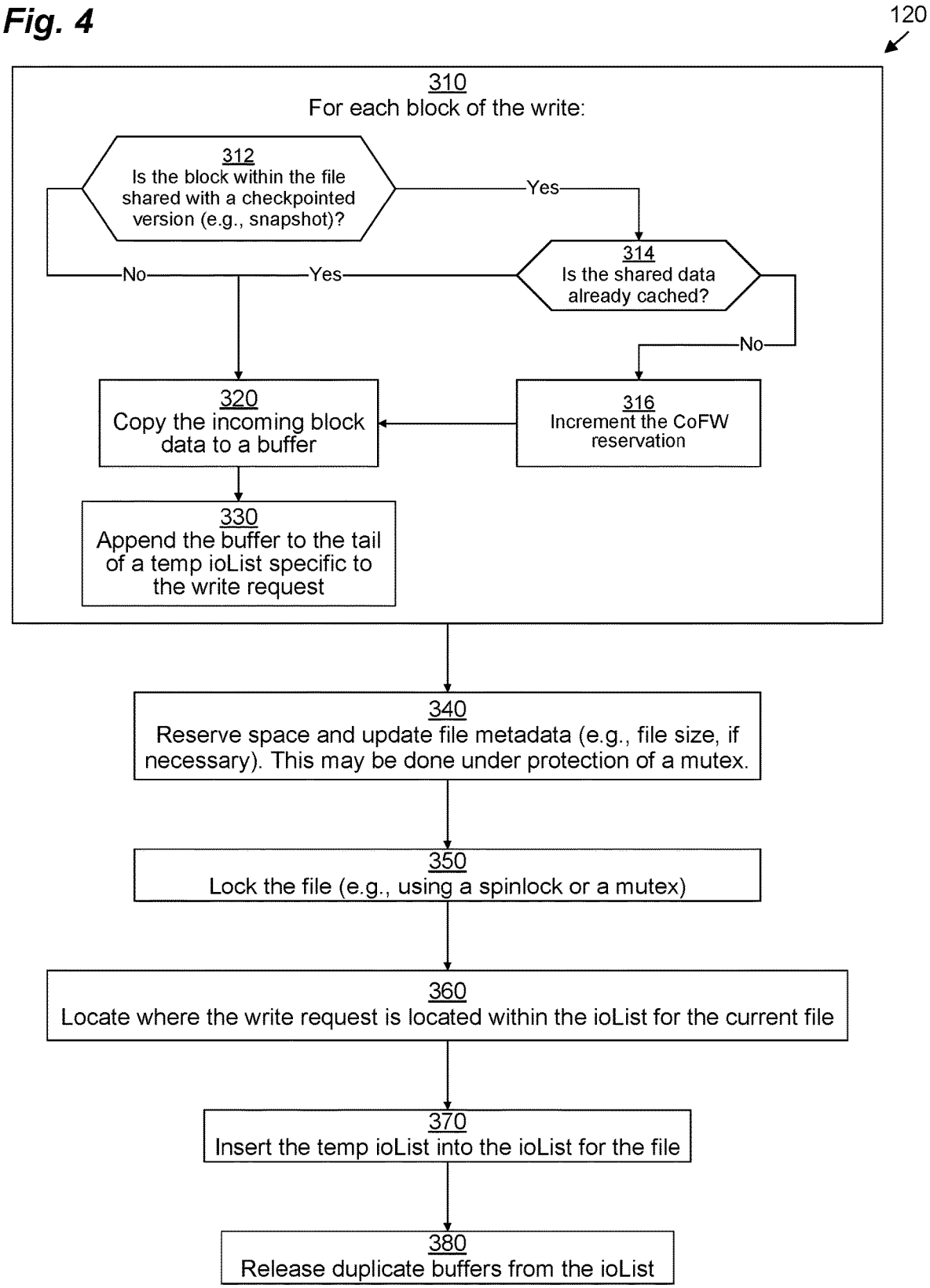

THROTTLING WRITES WITH ASYNCHRONOUS FLUSHING

BACKGROUND

A data storage system is an arrangement of hardware and software that typically includes one or more storage processors coupled to an array of non-volatile data storage devices, such as magnetic disk drives, electronic flash drives, and/or optical drives. The storage processors service host input/output (I/O) operations received from host machines. The received I/O operations specify storage objects (e.g. logical disks or "LUNs") that are to be written to, read from, created, or deleted. The storage processors run software that manages incoming I/O operations and that performs various data processing tasks to organize and secure the host data received from the host machines and stored on the non-volatile data storage devices.

Some data storage systems organize data into filesystems, which are stored on respective LUNs. Some of these systems utilize mapped LUNs that are made up of pieces of underlying storage that are assembled together and then mapped to particular addresses. In these systems, there is some latency associated with mapping locations within a filesystem to locations on the underlying storage, especially on new writes. Thus, in order to speed up operation, these systems may cache incoming writes to the filesystem, allowing the data to be "flushed" to the underlying storage at a later time.

SUMMARY

Unfortunately, the above-described conventional approaches suffer from deficiencies. For example, if the incoming writes come in so fast that the cache is overwhelmed, then future writes may be blocked. This result may be mitigated by use of synchronous flushing. In these techniques, when a new write is cached, if the amount of memory remaining within the cache is too low, the system may initiate a synchronous flush of data to the underlying storage prior to completing the cache of the new write. Unfortunately, although this clears up the cache for future writes, it may introduce a significant latency on those writes that happen to occur just as the cache fills beyond a threshold. Thus, when the write bandwidth is too high, the maximum latency (as well as the average latency) may spike. In one example high performance data storage system, when the write bandwidth is higher than about 1.5 gigabytes per second (GBps), the maximum write latency may increase from a typical value in the millisecond range to instead be over 8 seconds.

Thus, it would be desirable for a data storage system to be able to flush data to underlying storage when the write bandwidth is high while only minimally impacting the maximum latency. This may be accomplished by utilizing asynchronous flushing and by throttling incoming writes by preventing too many asynchronous flushes from happening when the amount of available cache space is too small. In the example high performance data storage system mentioned above, when these techniques are applied, even when the write bandwidth is higher than about 1.5 gigabytes per second (GBps), the maximum write latency has been experimentally found to drop from 8 seconds to about 200 milliseconds.

Further improvements may also be made. When snapshotting or de-duplication is used on files or filesystems, some blocks of underlying storage may be shared between several different filesystem-level blocks. This can further impact the amount of time needed to flush data because when a shared block is written to, it will need to be unshared and an additional underlying block will need to be allocated to store the new data. In addition, write cache space must be reserved to make sure that there is enough space to temporarily store both the old data (which is still in-use by other snapshots or by other de-duplicated blocks) and the new data. This is referred to as Copy on First Write (CoFW). However, when snapshots are used and CoFW is used to protect the shared data, the system may underestimate or overestimate the amount of space that it needs to reserve for CoFW storage buffers. If the system overestimates this amount, it may initiate write throttling even when the amount of available memory is still rather large. Thus, for example, a system employing CoFW may initiate write throttling once the amount of available write cache drops below 65%. In an improved version, a reservation of an amount of space actually needed to store CoFW buffers is subtracted, allowing the threshold to drop to a smaller threshold (e.g., 45%). In an example system, this improvement has been experimentally found to improve the maximum write latency by a factor of 18 or more and to improve the average write latency by a factor of 10.

In addition, further improvements can be made even when the write bandwidth is not excessive. In a typical system, each file of a filesystem is protected by a separate mutex, allowing only one write operation to be cached for a particular file at a time. In an improvement, only a portion of the write caching process is placed under the protection of the mutex, allowing a significant portion of the write caching for any given write operation to be performed without needing the mutex, allowing some increased parallelization. In some embodiments, instead of a mutex, a spinlock may be utilized instead due to the decreased time for which protection is needed, further improving latency. In the example high performance data storage system mentioned above, when these improvements are applied in a low bandwidth situation (e.g., write bandwidth of only about 0.6 GBps), the average write latency has been experimentally found to drop by over a factor of 100 from about 13 milliseconds to about 80 microseconds.

In one embodiment, a method of efficiently processing a set of write requests received by a computerized data storage system, each write request identifying a respective set of block-aligned data to be written to a respective contiguous region of a file, is performed. The method includes, for each of the set of write requests: (1) copying the block-aligned data of that write request into a file-specific ordered list of buffers, (2) after copying, performing a decision operation configured to (a) produce a first result when an amount of memory of the computerized data storage system available for storing buffers drops below a threshold amount and (b) produce a second result when the amount of memory of the computerized data storage system available for storing buffers exceeds the threshold amount, (3) in response to the decision operation producing the first result when processing a first write request, entering a waiting state before proceeding, the waiting state suspending processing of the first write request until a currently-busy asynchronous flushing thread becomes idle, (4) in response to the decision operation producing the second result when processing a second write request, proceeding to process the second write request without entering the waiting state, (5) upon proceeding for both the first write request and the second write request, configuring an available asynchronous flushing thread to asynchronously flush data buffers from the file-specific ordered list to underlying persistent storage, and (6) in response to configuring the asynchronous flushing thread, sending an acknowledgment of completion of that write request back to a client which issued that write request. An apparatus, system, and computer program product for performing a similar method are also provided.

The foregoing summary is presented for illustrative purposes to assist the reader in readily grasping example features presented herein. However, the foregoing summary is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

FIG. 4 is a flowchart depicting example methods of various embodiments.

DETAILED DESCRIPTION OF THE INVENTION

Embodiments are directed to techniques for allowing a data storage system to be able to flush data to underlying storage when the write bandwidth is high while only minimally impacting the maximum latency. This may be accomplished by utilizing asynchronous flushing and by throttling incoming writes by preventing too many asynchronous flushes from happening when the amount of available cache space is too small. Further improvements may also be made. Thus, for example, an improved system employing Copy on First Write (CoFW) may initiate write throttling only once the amount of available write cache drops below a dynamically-calculated threshold that accounts for an amount of space actually needed to store CoFW buffers. As another example, only a portion of the write caching process is placed under the protection of a mutex or a spinlock, allowing a significant portion of the write caching for any given write operation to be performed without needing the mutex or spinlock, allowing some increased parallelization.

Figure 1:
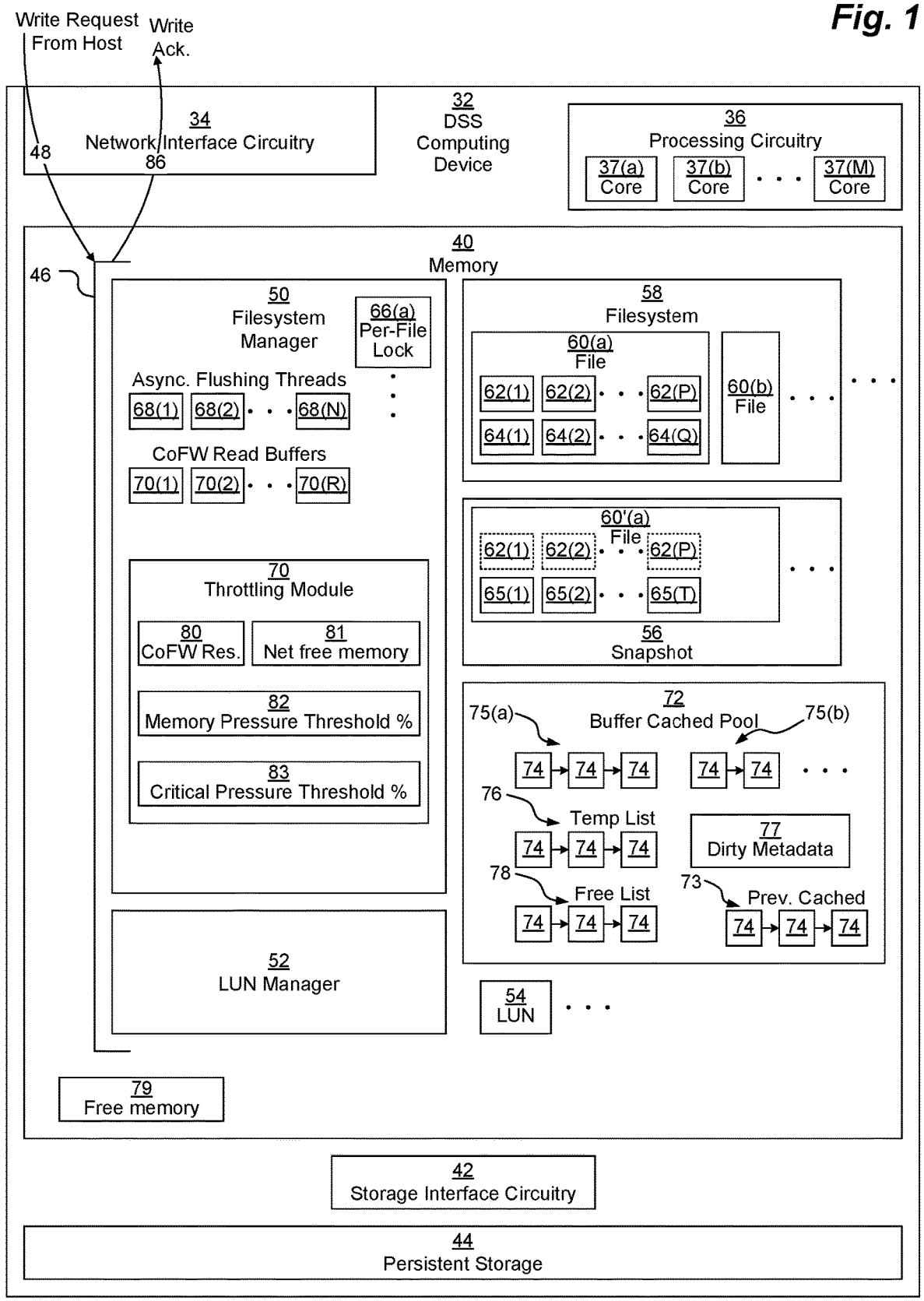
FIG. 1 is a block diagram depicting an example apparatus for use in connection with various embodiments.

FIG. 1 depicts an example computing device 32 serving as a data storage system (DSS). DSS computing device 32 may be any kind of computing device, such as, for example, a personal computer, workstation, server computer, enterprise server, DSS rack server, laptop computer, tablet computes, smart phone, mobile computer, etc. In an example, computing device 32 is a DSS rack server.

DSS computing device 32 includes network interface circuitry 34, processing circuitry 36, memory 40, storage interface circuitry 42, and persistent data storage 44. DSS computing device 32 may also include other components as are well-known in the art, including interconnection circuitry.

Network interface circuitry 34 may include one or more Ethernet cards, cellular modems, Fibre Channel (FC) adapters, Wireless Fidelity (Wi-Fi) wireless networking adapters, and/or other devices for connecting to a network (not depicted). Network interface circuitry 34 allows the DSS computing device 32 to communicate with one or more host devices (not depicted) capable of sending data storage commands to the DSS computing device 32 (e.g., a write command 48) over the network to be fulfilled.

Processing circuitry 36 may be any kind of processor or set of processors configured to perform operations, such as, for example, a microprocessor, a multi-core microprocessor, a digital signal processor, a system on a chip, a collection of electronic circuits, a similar kind of controller, or any combination of the above. As depicted, processing circuitry 36 includes a plurality of processing cores 37 (depicted as cores 37(a), 37(b), . . . , 37(M)), allowing M (or, in some embodiments, twice M) simultaneous threads to be executed the processing circuitry 36 at once.

In some embodiments, DSS computing device 32 may be built as a set of two or more storage processors (SPs, not depicted) each mounted on a separate board, each SP having its own network interface circuitry 34, processing circuity 36, memory 40, and storage interface circuitry 42, but sharing the storage 44 between them. In such embodiments, a high-speed inter-SP bus may connect the SPs. There may be more than one SP installed in DSS computing device 32 for redundancy and performance reasons. In these embodiments, each SP may be considered independently for purposes of this disclosure.

Persistent storage 44 may include any kind of persistent storage devices, such as, for example, hard disk drives, solid-state storage devices (SSDs), flash drives, etc. Storage interface circuitry 42 controls and provides access to persistent storage 44. Storage interface circuitry 42 may include, for example, SCSI, SAS, ATA, SATA, FC, M.2, and/or other similar controllers and ports.

Memory 40 may be any kind of digital system memory, such as, for example, random access memory (RAM). Memory 40 stores an operating system (OS, not depicted) in operation (e.g., a Linux, UNIX, Windows, MacOS, or similar operating system kernel). Memory 40 also stores a storage driver stack 46 which executes on processing circuitry 36 to fulfill data storage requests from hosts. Storage driver stack 46 may include several different storage-related drivers. Although most of these drivers are not depicted, two specific drivers of the storage driver stack 46 are depicted: a filesystem manager 50 and a LUN manager 52.

Filesystem manager 50 is configured to manage one or more filesystems 58 installed on the DSS computing device 32. Each filesystem 58 is configured to be stored on a particular logical volume (also referred to as a logical unit number LUN 54) of the DSS computing device 32. Each filesystem 58 may store one or more files 60 (depicted as files 60(a), 60(b), . . . ) as is well-known in the art. Each file 60 includes one or more data blocks 62, 64 that stores the data of the file 60, as is well-known in the art. In some arrangements, filesystem manager 50 may also manage one or more snapshots 56 that each preserve previous versions of one or more files 60 as checkpointed files 60'. When first created, a snapshot 56 does not include actual copies of the data of the checkpointed files 60'. Rather, a checkpointed file 60' of a snapshot 56 initially shares shared data blocks 62 (depicted as shared blocks 62(1), 62(2), . . . , 62(P) with dashed borders to indicate that these blocks are not actually stored separately as part of the snapshot 56) with a respective file 60. However, as data of a file 60 is modified, a block which is originally shared (e.g., shared data block 62(2)) may be overwritten with a new unshared data block 64 (e.g., unshared data block 64(1)). Once that happens, the previously-shared data block 64(2) is removed from the file 60, but it is still maintained within the snapshot 56 as an unshared data block 65 (e.g., unshared data block 65(1)) within the checkpointed file 60'. Once that happens, metadata of the snapshot 56 (e.g., inodes and indirect blocks, not depicted) may need to be modified (or created, if the file 60 previously shared all its metadata with the checkpointed file 60').

It should be understood that although certain data, including a filesystem 58, file 60, shared blocks 62, unshared blocks 64 (depicted as unshared blocks 64(1), 64(2), ..., 64(Q)), unshared blocks 65 (depicted as unshared blocks 65(1), 65(2), ..., 65(T)), LUNs 54, and snapshots 56 are depicted as being stored within memory 40, in some embodiments, some or all of this data may not actually be stored within memory 40. Rather, it may be stored within persistent storage 44. However, typically, when a file 60 is being actively-accessed, at least some of its blocks 62, 64 are cached within memory 40.

LUN manager 52 is configured to manage one or more LUNs 54 that are backed by persistent storage 44. In some embodiments, each LUN is backed by one or more slices (not depicted) of data drawn from the persistent storage 44. These slices may be joined together to create a "lower deck filesystem" (LDFS) that stores one or more files (not depicted). One file stored on the LDFS is a volume file that represents a LUN 54.

Memory 40 also includes various other data structures used by the OS, storage driver stack 46, and various other applications (not depicted). This data includes at least a buffer cache pool (BCP) 72, which serves as a cache. BCP 72 includes one or more cached buffers 74 that may store data to be later flushed to data blocks of an underlying LUN 54 (and eventually stored on persistent storage 44). Each buffer 74 is typically the same size as a filesystem 58 data block 62, 64, which is also the same size as a block within a LUN 54. This block size may vary depending on the embodiment, but in a typical embodiment, it is a power of 2 number of bytes, such as 8,192 byes (8 KB). The BCP 72 may store one or more ioLists 75 (depicted as ioLists 75(a), 75(b), ... ), each of which is a linked list of buffers 74 that store cached data of data blocks to be inserted into a respective file 60 of a filesystem 58. These buffers 74 will eventually be flushed to blocks of the underlying LUN 54 (and eventually stored in persistent storage 44), but for the moment, they are cached in the BCP 72. There is a separate ioList 75 for each file 60 (although, if there are no pending cached writes for a particular file 60, there may be no corresponding ioList 75 within the BCP 72 at that time). The buffers 74 within an ioList 75 are arranged in an order such that a buffer with a lower logical address within the file 60 is stored earlier in the ioList 75 than a buffer 74 with a higher logical address within the file 60. However, the buffers 74 may not always represent contiguous blocks of the file 60, if there are blocks of the file 60 that are not currently cached to be overwritten.

BCP 72 may also include buffers 74 that were previously cached on a previously-cached list 73. The previously-cached list 70 may include buffers 74 that were previously on an ioList 75 but have since been flushed to disk as well as buffers 74 that were previously loaded for read caching purposes. BCP 72 may also include one or more unallocated buffers 74 (which may either be empty or only store invalid data) on a free list 78. Although ioLists 75, previously-cached list 73, and free list 78 are depicted as singly-linked lists, they may be any kind of linked lists, including doubly-linked lists. BCP 72 may also store dirty metadata 77 that is cached and will eventually be flushed as well.

Memory 40 also includes free memory 79 that is not currently allocated for any purpose.

Filesystem manager 50 may receive a write request 48 directing it to write a set of data to an address range within a file 60 of a filesystem 58 that it manages. As described herein, the data of the write request 48 is block-aligned and contiguous, meaning that it starts at an address that defines the beginning of a particular block 62, 64 of the file and it contains an amount of data that is a multiple of the fixed block size (e.g., 8 KB). Thus, for example, a write request may include 64 KB of data that is addressed to block addresses n to n+7 within a file 60. In operation, filesystem manager 50 may first loop through each block-sized amount of data of the write request 48 and store that data in a buffer 74 within BCP, appending each newly-allocated buffer 74 to a temporary ioList 76 of the BCP 72. Each write request 48 has its own respective temporary ioList 76, and the buffers 74 of a temporary ioList 75 are stored in consecutive order. Thus, for a write request aimed at block addresses n to n+7 within a file 60(X), the first buffer of the temporary ioList 76 represents the data to be written to block address n of the file 60(X), the second buffer of the temporary ioList 76 represents the data to be written to block address n+1 of the file 60(X), etc. A temporary ioList 76 may be configured as either an array or as a linked list, which may be either singly-linked or doubly-linked.

If the address range of the write request 48 includes a shared block 62 of the file 60(X), then the filesystem manager 50 increments a CoFW reservation 80 so that when data is later flushed, the data stored within that shared block 62 can eventually be copied into a CoFW read buffer 70 (depicted as CoFW read buffers 70(1), 70(2), ..., 70(R)) to be preserved (although, if the shared block 62 is already cached within a buffer 74 of the previously-cached list 73, the CoFW reservation 80 may not be incremented, since the data is already cached and there is no need to store it again in a CoFW read buffer 70).

Once the data of the write request 48 has been fully-inserted into a respective temporary ioList 76, filesystem manager 50 obtains a per-file lock 66(X) on the file 60(X), which temporarily prevents other write requests from modifying that file 60(X). Depending on the embodiment, the per-file locks 66 may either be mutexes or spinlocks, as are both well-known in the art. Once the per-file lock 66(X) is obtained, filesystem manager 50 may insert the buffers 74 of the temporary ioList 76 into an appropriate location of the respective ioList 75(X) for that file 60(X), discarding any buffers 74 that were previously on the ioList 75 that are being replaced by new buffers 74 from the temporary ioList 76. Once this is done, if the ioList 75(X) is not very long (i.e., not longer than a threshold length, e.g., not longer than 2048 buffers 74), filesystem manager 50 may return the per-file lock 66(X) and complete the write request 48 by sending a write acknowledgment signal 86 back to the host that issued the write request 48.

However, if the ioList 75(X) is very long (i.e., longer than the threshold length, e.g., longer than 2048 buffers 74), filesystem manager 50 will first initiate a flushing operation on the ioList 75(X), prior to releasing the per-file lock 66(X) and issuing the acknowledgment signal 86. Filesystem manager 50 includes a throttling module 70, which is configured to perform throttling to improve write performance on the filesystems 58. Thus, once the ioList 75(X) is determined to be above the threshold length, throttling module 70 executes to determine if throttling is needed.

Throttling module 70 determines if a net free memory amount 81 is less than a memory pressure threshold percentage 82 of total memory 40. If not, then the DSS computing device 32 is not currently experiencing high memory pressure, and the filesystem manager 50 may immediately configure an asynchronous flushing thread 68 (depicted as asynchronous flushing threads 68(1), 68(2), . . . , 68(N)) to asynchronously flush the ioList 75(X). The fact that these threads 68 are asynchronous means that they may be initiated and left to run without requiring completion before the issuer moves on. Thus, once the filesystem manager 50 initiates an asynchronous flushing thread 68 to asynchronously flush the ioList 75(X), filesystem manager 50 may then return the per-file lock 66(X) and complete the write request 48 by sending a write acknowledgment signal 86 back to the host that issued the write request 48. The memory pressure threshold percentage 82 may be any percentage, but in some embodiments, it is within a range of 40%-50%, for example 45%.

However, if the throttling module 70 determines that the net free memory amount 81 is less than a memory pressure threshold percentage 82 of total memory 40 (but larger than the critical pressure threshold percentage 83), then throttling module 70 will first wait for a currently-running asynchronous flushing thread 68(Y) to become idle before proceeding to configure that asynchronous flushing thread 68(Y) to asynchronously flush the ioList 75(X). Once the filesystem manager 50 initiates the asynchronous flushing thread 68(Y) to asynchronously flush the ioList 75(X), filesystem manager 50 may then return the per-file lock 66(X) and complete the write request 48 by sending a write acknowledgment signal 86 back to the host that issued the write request 48.

In some embodiments, if the throttling module 70 determines that the net free memory amount 81 is less than the critical pressure threshold percentage 83, then throttling module 70 will instead perform a synchronous flush by fully flushing the ioList 75(X) (or at least flush a portion of the ioList 75(X), in some embodiments) prior to returning the per-file lock 66(X) and completing the write request 48 by sending a write acknowledgment signal 86 back to the host that issued the write request 48. The critical pressure threshold percentage 83 may be any percentage, but in some embodiments, it is within a range of 15%-25%, for example 20%.

In some embodiments, the net free memory amount 81 is simply calculated by looking at a size of the free list 78. The net free memory amount 81 may then be compared either to the size of the BCP 72 or to the total size of the memory 40 (or to an amount of the memory 40 allocated to the filesystem manager 50).

In embodiments that utilize improved techniques for dealing with CoFW, the net free memory may instead be calculated according to a more complicated technique involving the CoFW reservation size 80. See below in connection with FIG. 3.

In some embodiments, memory 40 may also include a persistent storage portion (not depicted). Persistent storage portion of memory 40 may be made up of one or more persistent storage devices, such as, for example, disks. Persistent storage portion of memory 40 or persistent storage 44 is configured to store programs and data even while the DSS computing device 32 is powered off. The OS, applications, and storage driver stack 46, are typically stored in this persistent storage portion of memory 40 or on persistent storage 44 so that they may be loaded into a system portion of memory 40 from this persistent storage portion of memory 40 or persistent storage 44 upon a system restart or as needed. Storage driver stack 46 or its various software components, such as filesystem manger 50, LUN manager 52, or throttling manager 70), when stored in non-transient form either in the volatile portion of memory 40 or on persistent storage drives 44 or in persistent portion of memory 40, forms a computer program product. The processing circuitry 36 running one or more applications and/or storage driver stack 46 and/or one of its components thus forms a specialized circuit constructed and arranged to carry out the various processes described herein.

Figure 2:
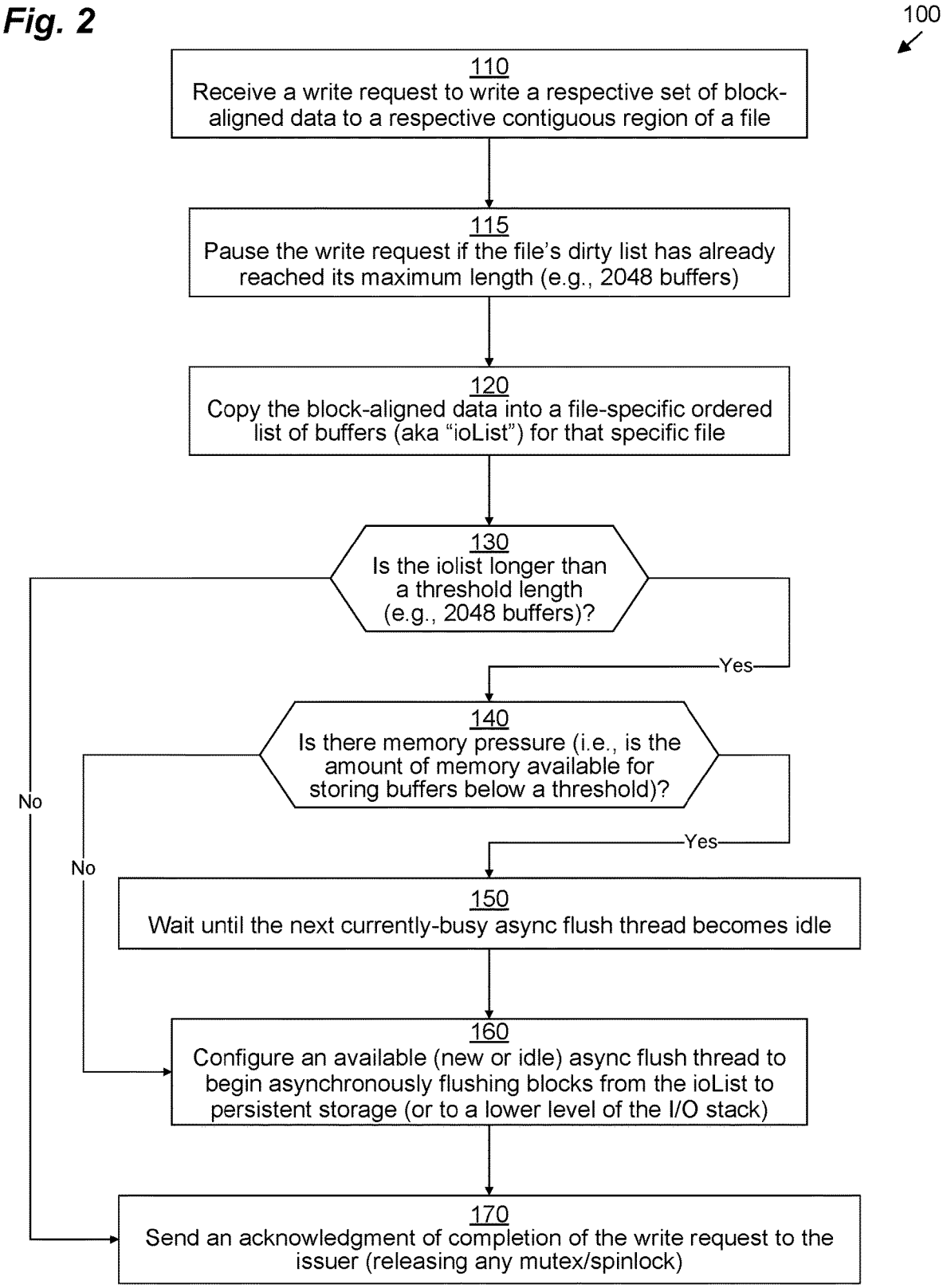
FIG. 2 is a flowchart depicting example methods of various embodiments.

FIG. 2 illustrates an example method 100 performed by storage driver stack 46 (and more particularly, by filesystem manager 50) for efficiently ingesting data in accordance with various embodiments. It should be understood that any time a piece of software (e.g., storage driver stack 46, filesystem manager 50, throttling module 70, LUN manager 52, etc.) is described as performing a method, process, step, or function, in actuality what is meant is that a computing device (e.g., DSS computing device 32) on which that piece of software is running performs the method, process, step, or function when executing that piece of software on its processing circuitry 36. It should be understood that one or more of the steps or sub-steps of method 100 may be omitted in some embodiments. Similarly, in some embodiments, one or more steps or sub-steps may be combined together or performed in a different order. Method 100 is performed by DSS computing device 32.

In step 110, filesystem manager 50 receives a write request 48 instructing it to write a set of block-aligned data to a contiguous region of a file 60(X). This write request 48 is addressed to a set of contiguous blocks of the file 60(X) (e.g., to logical block addresses n to n+z for a set of data having a block length of z+1).

In step 115, filesystem manager 50 may temporarily pause the write request if the ioList 75(X) (also referred to as a "dirty list") for that file 60(X) has already reached (or exceeded, depending on the implementation) the maximum threshold length (e.g., 2048 buffers 74 long). Typically, this will only happen if another write request 48 aimed at the same file 60(X) is already pending, and that other write request 48 has added new buffers 74 to the ioList 75(X) for that file 60(X) beyond the threshold maximum length. Typically, this pause will continue either until an asynchronous flushing thread 68(Y) configured to flush the ioList 75(X) has completed or at least until it has reduced the length of the ioList 75(X) below the threshold maximum (depending on the embodiment). In the rare instance in which the throttling module 70 performs synchronous flushing, the pause will continue until the synchronous flushing operation has finished.

Then, in step 120, filesystem manager 50 copies the block-aligned data of the write request 48 into buffers 74 within the ioList 75(X) for that file 60(X). It should be noted that there are various ways in which step 120 may be implemented. In one embodiment, filesystem manager 50 may obtain a per-file lock 66(X) for that file, and then add all the data into the ioList 75(X). In other improved embodiments, step 120 may instead be implemented as described below in connection with FIG. 4. In any event, step 120 involves obtaining a per-file lock 66(X) on the file 75(X) that is not released until later (see below in connection with step 170).

Then, in step 130, filesystem manager 50 determines whether or not the ioList 75(X) exceeds the threshold length (e.g., 2048 buffers 74). If it does not, then operation proceeds directly with step 170, in which the per-file lock 66(X) is released and the write acknowledgment signal 86 is back to the host that issued the write request 48. However, if the ioList 75(X) does exceed the threshold length, then operation instead proceeds with step 140.

In step 140, throttling module 70 of filesystem manager 50 determines whether or not there is currently high memory pressure with reference to the net free memory 81 and the memory pressure threshold percentage 82. There are various ways in which step 140 may be implemented. In some improved embodiments, step 140 may be implemented as described below in connection with FIG. 3. If the memory pressure is determined to not be high, then operation proceeds directly with step 160, but, if the memory pressure is determined to be high (but not critically-high; see below in connection with step 240 of FIG. 3), then operation proceeds with step 150 prior to step 160.

In step 150, throttling module 70 waits until at least one currently-running asynchronous flushing thread 68(Y) of a set of currently-running asynchronous flushing threads 68 becomes idle (as long as there is at least one currently-running asynchronous flushing thread 68—if not, step 150 is skipped). An asynchronous flushing thread 68 becomes idle when it has finished flushing an ioList 75 that it was previously flushing. Then operation proceeds to step 160.

In step 160, throttling module 70 configures an available asynchronous flushing thread 68 (e.g., the asynchronous flushing thread 68(Y) which just became idle in step 150, or, in the event that step 150 was skipped, either a newly-allocated asynchronous flushing thread 68(Y) or some previously-idle asynchronous flushing thread 68(Y)) to begin asynchronously flushing buffers 74 from the ioList 75(X) for the current file 60(X) down the storage driver stack 46 (e.g., to the LUN manager 52, so that blocks representing the buffers 74 can be inserted into correct positions within the LDFS and LUN 54, the data eventually being stored within persistent storage 44). During this flushing process, as writes to previously shared data blocks 62 are flushed, the data of those shared data blocks 62 may be copied to respective CoFW read buffers 70 (unless that data is already stored within a buffer 74 of the previously-cached list 73), so that that data can eventually also be flushed to the snapshot 56. Once the asynchronous flushing thread 68(Y) has been initiated, operation may proceed directly with step 170. Because DSS computing device 32 has multiple cores 37, several threads (including several asynchronous flushing threads 68 may execute in parallel with other threads implementing filesystem manager 50).

Finally, in step 170, filesystem manager 50 releases the per-file lock 66(X) and sends write acknowledgment signal 86 back to the host that issued the write request 48.

Figure 3:
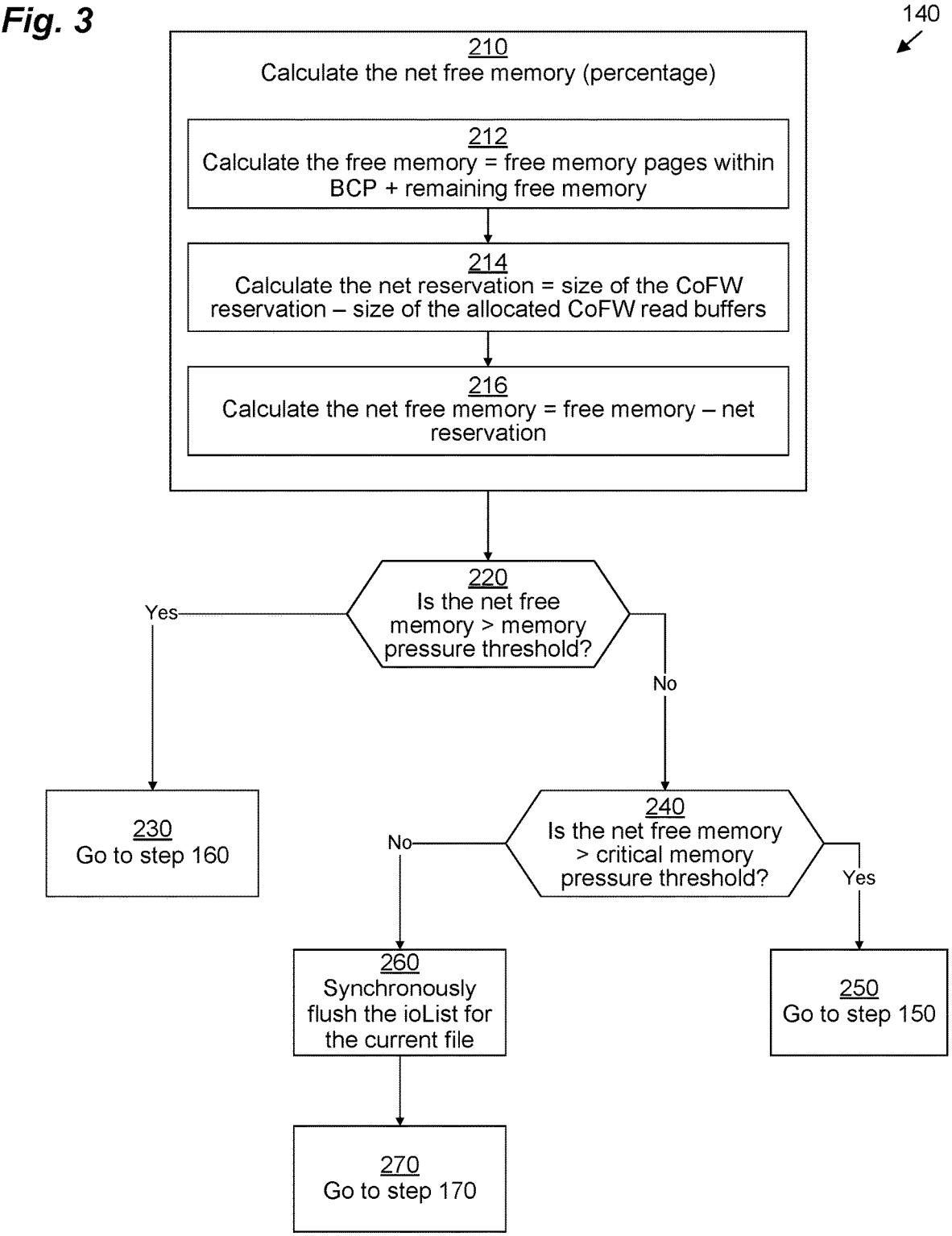
FIG. 3 is a flowchart depicting example methods of various embodiments.

FIG. 3 illustrates an example way of implementing step 140, performed by throttling module 70. It should be understood that one or more of the steps or sub-steps depicted in FIG. 3 may be omitted in some embodiments. Similarly, in some embodiments, one or more steps or sub-steps may be combined together or performed in a different order.

In step 210, throttling module 70 first calculates the net free memory 81. In some embodiments, this may be done by performing sub-steps 212-216.

In sub-step 212, throttling module 70 calculates a total amount of free memory by summing together a size of the buffers 74 on the free list 78 of the BCP 72 with the size of the free (unallocated) memory 79.

In sub-step 214, throttling module 70 calculates a net reservation by subtracting a size of all the CoFW read buffers 70 that are currently allocated (e.g., by multiplying the number, R, of CoFW read buffers 70 by the block size, e.g., 8 KB) from a CoFW reservation size. The CoFW reservation size may be calculated by multiplying the block size (e.g., 8 KB) by the CoFW reservation 80. The CoFW reservation 80 represents the total number of shared blocks 62 that have been modified by write requests 48 although the writes to those shared data blocks 62 have not yet been flushed. However, any shared blocks 62 that were already stored in buffers 74 of the previously-cached list 73 may be excluded from the CoFW reservation 80 (see above in connection with Par. 0029 and below in connection with the description of sub-steps 314-316 of FIG. 4).

Finally, in sub-step 216, throttling module 70 calculates the net free memory 81 by subtracting the net reservation (calculated above in sub-step 214) from the total amount of free memory (calculated above in sub-step 212). It should be understood that, although depicted as three consecutive steps 212, 214, 216, the same functionality as described in these steps 212, 214, 216 may be implemented by performing all of these steps in one complex operation or in a different order.

Once the net free memory 81 has been calculated, in step 220, throttling module 70 determines whether or not the net free memory 81 (expressed as a percentage of the total amount of memory 40 or a portion of memory 40 available to the filesystem manager 50) exceeds the memory pressure threshold percentage 82. If it does, then operation proceeds with step 230, which returns to step 160 of method 100. Otherwise, operation proceeds with step 240.

In step 240, throttling module 70 determines whether or not the net free memory 81 (expressed as a percentage again) exceeds the critical memory pressure threshold 83. If it does, then operation proceeds with step 250, which returns to step 150 of method 100. Otherwise, operation proceeds with step 260.

In step 260, throttling module 70 synchronously flushes the ioList 75(X) for the current file 60(X). Only once the synchronous flushing operation completes does operation proceed to step 270, which returns to step 170 of method 100.

FIG. 4 illustrates an example way of implementing step 120, performed by filesystem manager 50. It should be understood that one or more of the steps or sub-steps depicted in FIG. 4 may be omitted in some embodiments. Similarly, in some embodiments, one or more steps or sub-steps may be combined together or performed in a different order.

In step 310, filesystem manager 50 iterates through each block of data of the write request 48 in order, performing various sub-steps 312-330 for each block. It should be understood that in some embodiments, sub-steps 312-316 may be omitted (e.g., if the DSS computing device 32 is not configured to implement snapshots 56 at all or if it is known that the present file 60(X) is not checkpointed into any snapshots 56.

First, in sub-step 312, filesystem manager 50 checks whether the block 62, 64 being targeted within the file 60(X) is shared with a checkpointed file 60'(X) (e.g., in a snapshot 56). In some embodiments, sub-step 312 also evaluates affirmatively if the block 62, 64 being targeted within the file 60(X) is shared with any other block due to de-duplication. Effectively, sub-step 312 evaluates affirmatively if the block 62, 64 being targeted within the file 60(X) is a shared block 62 rather than an unshared block 64 (or a block of the file 60(X) that has not yet been allocated at all). If sub-step 312 evaluates affirmatively, then operation proceeds with sub-step 314. Otherwise, operation proceeds directly with sub-step 320.

In sub-step 314, filesystem manager 50 checks whether the data of the shared block 62 has previously been copied to a buffer 74 that remains on the previously-cached list 73. If it has, then operation proceeds with sub-step 320, since there is no need to reserve a CoFW read buffer 70 for the previously-shared data when the previously-shared data is already cached. Otherwise, operation first proceeds with sub-step 316.

In sub-step 316, filesystem manager 50 increments the CoFW reservation 80. This ensures that when the write to the shared block 62 is flushed, there is enough space in memory to allocate a CoFW read buffer 70 to store the data from the previously-shared block 62. That CoFW read buffer 70 is then configured to hold a copy of the previously-shared data until the previously-shared data can be flushed to the snapshot 56.

In sub-step 320, filesystem manager 50 copies the appropriate data (i.e., the data that is targeted to be written to the block 62, 64 of the file 60(X) in question) from the write request 48 into a buffer 74 of the BCP 72. Then, in sub-step 330, filesystem manager 50 appends the buffer 74 created in step 320 to the tail of the temporary ioList 76 that is specific to the current write request 48. If the temporary ioList 76 has not been created yet (i.e., it is currently the first data block of the write request 48 being iterated through), filesystem manager 50 creates the new temporary ioList 76.

After looping through all the blocks of the write request 48, in step 340, filesystem manager 50 reserves space within the filesystem for the new blocks to be written and updates metadata (e.g., the inode and/or one or more indirect blocks) of the file 60(X). This updating may include updating block pointers within the inode and/or one or more indirect blocks and updating the file size information within the inode. This step 340 may be performed under the protection of a file-specific lock (e.g., a mutex or spinlock), although it is typically a different a file-specific lock than the file-specific lock 66(X) used in step 350.

Then, in step 350, filesystem manager 50 locks the file 60(X) using a file-specific lock 66(X). In some embodiments, file-specific lock 66(X) is a mutex. In other embodiments, a spinlock is used instead, thereby increasing performance by avoiding context-switching between threads. If the file-specific lock 66(X) has already been issued to another thread of the filesystem manager 50 (e.g., a thread that is already processing another write request 48), then operation stalls at step 360. If the file-specific lock 66(X) is a spinlock, the thread of the filesystem manager 50 that is processing the current write request 48 will continue to wait without thread-switching until the spinlock is available, but since the steps protected by the spinlock are quick (steps 360-380 and 130-170, but, importantly, not including step 310, which may take a long time), the use of a spinlock is efficient. It should be noted, however, that in embodiments that use a spinlock, the spinlock may be released in step 150 but reacquired in step 160. In addition, in embodiments that use a spinlock, the spinlock may be released at the beginning of step 260 but reacquired at the end of step 260. If the file-specific lock 66(X) is a mutex, the thread of the filesystem manager 50 that is processing the current write request 48 will pause, allowing other threads to take its place until the mutex is available.

Once the file-specific lock 66(X) has been obtained, in step 360, filesystem manager 50 locates a position in the ioList 75(X) for the file 60(X) of the blocks 62, 64 of the file 60(X) to which the write request 48 is directed. Thus, for example, if the write request 48 is directed at blocks 4,918-4,937 of file 60(X) and the ioList 75(X) includes a buffer 74 aimed at block 4,912 followed by another buffer 74 aimed at block 4,993, then filesystem manager 50 locates the position in the ioList 75(X) immediately following the buffer 74 aimed at block 4,912.

As another example, if the write request 48 is directed at blocks 3,247-3,263 of file 60(X) and the ioList 75(X) includes a buffer 74 aimed at block 3,240 followed by a second buffer 74 aimed at block 3,250, a third buffer 74 aimed at block 3,251, and a fourth buffer 74 aimed at block 3,270, then filesystem manager 50 locates the position of the second buffer in the ioList 75(X). Filesystem manager 50 also keeps a record that both the second and third buffers 74 may be replaced and discarded, since they are overwritten by the current write request 48.

Then, in step 370, filesystem manager 50 insert the buffers 74 of the temporary ioList into the ioList 75(X) at the location that was determined in step 360, replacing any buffers 74 that were recorded as subject to replacement.

Finally, in step 380, filesystem manager 50 deallocates any buffers 74 that were recorded as subject to replacement (i.e., by placing them on the free list 78). Operation of method 100 may then resume at step 130. It should be noted that the file-specific lock 66(X) obtained in step 350 will eventually be released in step 170.

Thus, techniques have been presented for allowing a data storage system 32 to be able to flush data to underlying storage 44 when the write bandwidth is high while only minimally impacting the maximum latency. This may be accomplished by utilizing asynchronous flushing and by throttling incoming write requests 48 by preventing too many asynchronous flushes from happening when the amount of available cache space is too small. Further improvements may also be made. Thus, for example, an improved system employing Copy on First Write (CoFW) may initiate write throttling only once the amount of available write cache drops below a dynamically-calculated threshold 82 that accounts for an amount of space actually needed to store CoFW buffers 70. As another example, only a portion of the write caching process is placed under the protection of a mutex or a spinlock 66, allowing a significant portion of the write caching for any given write request 48 to be performed without needing the mutex or spinlock 66, allowing some increased parallelization.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

While various embodiments have been particularly shown and described, it will be understood by those skilled in the art that various changes in form and details may be made therein without departing from the spirit and scope of the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

What is claimed is:

1. A method of efficiently processing a set of write requests received by a computerized data storage system, each write request identifying a respective set of block-aligned data to be written to a respective contiguous region of a file, the method comprising, for each of the set of write requests:
    copying the block-aligned data of that write request into a file-specific ordered list of buffers;
    after copying, performing a decision operation configured to (a) produce a first result when an amount of memory of the computerized data storage system available for storing buffers drops below a threshold amount and (b) produce a second result when the amount of memory of the computerized data storage system available for storing buffers exceeds the threshold amount;
    in response to the decision operation producing the first result when processing a first write request, entering a waiting state before proceeding, the waiting state suspending processing of the first write request until a currently-busy asynchronous flushing thread becomes idle;
    in response to the decision operation producing the second result when processing a second write request, proceeding to process the second write request without entering the waiting state;
    upon proceeding for both the first write request and the second write request, configuring an available asynchronous flushing thread to asynchronously flush data buffers from the file-specific ordered list to underlying persistent storage; and
    in response to configuring the asynchronous flushing thread, sending an acknowledgment of completion of that write request back to a client which issued that write request.

2. The method of claim 1,
wherein the method further comprises:
    for each of the set of write requests, performing a testing operation, the testing operation configured to (a) produce a third result when a length of the file-specific ordered list of buffers exceeds a threshold length and (b) produce a fourth result when the length of the file-specific ordered list of buffers does not exceed the threshold length; and
    in response to the testing operation producing the fourth result when processing a third write request, directly sending acknowledgment of completion of the fourth write request back to a client which issued the fourth write request without configuring any asynchronous flushing thread to asynchronously flush data buffers from the file-specific ordered list to underlying persistent storage; and
    wherein the decision operation is performed in response to the testing operation producing the third result when processing the first and second write requests.

3. The method of claim 2 wherein the method further comprises, for each of the set of write requests, prior to copying the block-aligned data of that write request into the file-specific ordered list of buffers and upon determining that the length of the file-specific ordered list of buffers exceeds a threshold length, pausing that write request until the length of the file-specific ordered list of buffers no longer exceeds the threshold length.

4. The method of claim 1 wherein performing the decision operation includes:
    calculating the amount of memory of the computerized data storage system available for storing buffers by:
        determining a net Copy on First Write (CoFW) reservation by subtracting (i) an amount of memory space already allocated towards CoFW buffers from (ii) an amount of memory space that would be required to store copies of all uncached shared data blocks that have been overwritten and not yet flushed; and
        subtracting the determined net CoFW reservation from a total amount of free memory, yielding the amount of memory of the computerized data storage system available for storing buffers; and
    comparing the calculated amount of memory of the computerized data storage system available for storing buffers to the threshold amount, the threshold amount being a threshold percentage of total system memory.

5. The method of claim 4 wherein the threshold percentage is within a range from 40 percent to 50 percent.

6. The method of claim 5,
wherein the decision operation is further configured to (c) produce a third result when the amount of memory of the computerized data storage system available for storing buffers drops below a criticality threshold, the criticality threshold being within a range of 15 percent to 25 percent of total system memory; and
wherein the method further comprises, in response to the decision operation producing the third result when processing a third write request, triggering a synchronous flush without proceeding to configure an available asynchronous flushing thread to asynchronously flush data buffers.

7. The method of claim 1,
wherein copying the block-aligned data of that write request into the file-specific ordered list of buffers includes:
    performing a looped operation, wherein performing the looped operation includes, for each block-aligned page of that write request, starting with a block-aligned page corresponding to an initial address of the contiguous region and proceeding with consecutively-addressed block-aligned pages of that write request:
        copying data of that block-aligned page into a buffer; and
        inserting that buffer onto a tail of a temporary list of buffers specific to that write request;
    subsequent to performing the looped operation, obtaining a lock on the file of that write request; and
    subsequent to obtaining the lock, merging the temporary list of buffers into the file-specific ordered list of buffers; and
the method further comprises, subsequent to sending the acknowledgment of completion of that write request back to the client which issued that write request, releasing the lock on the file of that write request.

8. The method of claim 7 wherein the lock is a mutex.

9. The method of claim 7 wherein the lock is a spinlock.

10. The method of claim 7 wherein performing the looped operation further includes, for a particular block-aligned page of that write request:
   determining that the particular block-aligned page corresponds to a region of the file of that write request that shares its data with a checkpointed version of the file; and
   in response to determining, increasing a Copy on First Write (CoFW) reservation, the CoFW reservation ensuring that a CoFW read buffer will be available upon flushing to temporarily store the shared data until it can be inserted directly into the checkpointed version of the file.

11. An apparatus comprising:
   persistent storage hardware;
   network interface circuitry for communicating with a remote host; and
   multi-core processing circuitry coupled to memory configured to efficiently process a write request received by the network interface circuitry from the remote host, the write request identifying a respective set of block-aligned data to be written to a respective contiguous region of a file, by:
      copying the block-aligned data of the write request into a file-specific ordered list of buffers;
      after copying, performing a decision operation configured to (a) produce a first result when an amount of memory of the apparatus available for storing buffers drops below a threshold amount and (b) produce a second result when the amount of memory of the apparatus available for storing buffers exceeds the threshold amount;
      when the decision operation produces the first result, entering a waiting state before proceeding, the waiting state suspending processing of the write request until a currently-busy asynchronous flushing thread becomes idle;
      when the decision operation produces the second result, proceeding to process the write request without entering the waiting state;
      upon proceeding, configuring an available asynchronous flushing thread to asynchronously flush data buffers from the file-specific ordered list to the persistent storage hardware; and
      in response to configuring the asynchronous flushing thread, sending an acknowledgment of completion of the write request back to the remote host.

12. The apparatus of claim 11,
   wherein the multi-core processing circuitry coupled to memory is further configured to efficiently process the write request received by the network interface circuitry from the remote host by:
      for each of the set of write requests, performing a testing operation, the testing operation configured to (a) produce a third result when a length of the file-specific ordered list of buffers exceeds a threshold length and (b) produce a fourth result when the length of the file-specific ordered list of buffers does not exceed the threshold length; and
      in response to the testing operation producing the fourth result when processing a third write request, directly sending acknowledgment of completion of the fourth write request back to the remote host without configuring any asynchronous flushing thread to asynchronously flush data buffers from the file-specific ordered list to underlying persistent storage; and
   wherein the decision operation is performed in response to the testing operation producing the third result when processing the first and second write requests.

13. The apparatus of claim 11 wherein performing the decision operation includes:
   calculating the amount of memory of the apparatus available for storing buffers by:
      determining a net Copy on First Write (CoFW) reservation by subtracting (i) an amount of memory space already allocated towards CoFW buffers from (ii) an amount of memory space that would be required to store copies of all uncached shared data blocks that have been overwritten and not yet flushed; and
      subtracting the determined net CoFW reservation from a total amount of free memory, yielding the amount of memory of the apparatus available for storing buffers; and
   comparing the calculated amount of memory of the apparatus available for storing buffers to the threshold amount, the threshold amount being a threshold percentage of total system memory.

14. The apparatus of claim 11,
   wherein copying the block-aligned data of that write request into the file-specific ordered list of buffers includes:
      performing a looped operation, wherein performing the looped operation includes, for each block-aligned page of that write request, starting with a block-aligned page corresponding to an initial address of the contiguous region and proceeding with consecutively-addressed block-aligned pages of that write request:
         copying data of that block-aligned page into a buffer; and
         inserting that buffer onto a tail of a temporary list of buffers specific to that write request;
      subsequent to performing the looped operation, obtaining a lock on the file of that write request; and
      subsequent to obtaining the lock, merging the temporary list of buffers into the file-specific ordered list of buffers; and
   wherein the multi-core processing circuitry coupled to memory is further configured to efficiently process the write request received by the network interface circuitry from the remote host by, subsequent to sending the acknowledgment of completion of that write request back to the remote host, releasing the lock on the file of that write request.

15. A computer program product comprising a tangible non-transitory computer-readable storage medium storing instructions, which, when executed by a computerized data storage system, cause the computerized data storage system to efficiently process a write request received from a remote host, the write request identifying a respective set of block-aligned data to be written to a respective contiguous region of a file, by:
   copying the block-aligned data of the write request into a file-specific ordered list of buffers;
   after copying, performing a decision operation configured to (a) produce a first result when an amount of memory of the apparatus available for storing buffers drops below a threshold amount and (b) produce a second result when the amount of memory of the apparatus available for storing buffers exceeds the threshold amount;
when the decision operation produces the first result, entering a waiting state before proceeding, the waiting state suspending processing of the write request until a currently-busy asynchronous flushing thread becomes idle;
when the decision operation produces the second result, proceeding to process the write request without entering the waiting state;
upon proceeding, configuring an available asynchronous flushing thread to asynchronously flush data buffers from the file-specific ordered list to underlying persistent storage; and
in response to configuring the asynchronous flushing thread, sending an acknowledgment of completion of the write request back to the remote host.

16. The computer program product of claim 15,
wherein the instructions, when executed by the computerized data storage system, further cause the computerized data storage system to efficiently process the write request received from the remote host by:
for each of the set of write requests, performing a testing operation, the testing operation configured to (a) produce a third result when a length of the file-specific ordered list of buffers exceeds a threshold length and (b) produce a fourth result when the length of the file-specific ordered list of buffers does not exceed the threshold length; and
in response to the testing operation producing the fourth result when processing a third write request, directly sending acknowledgment of completion of the fourth write request back to the remote host without configuring any asynchronous flushing thread to asynchronously flush data buffers from the file-specific ordered list to underlying persistent storage; and
wherein the decision operation is performed in response to the testing operation producing the third result when processing the first and second write requests.

17. The computer program product of claim 15 wherein performing the decision operation includes:
calculating the amount of memory of the computerized data storage system available for storing buffers by:
determining a net Copy on First Write (CoFW) reservation by subtracting (i) an amount of memory space already allocated towards CoFW buffers from (ii) an amount of memory space that would be required to store copies of all uncached shared data blocks that have been overwritten and not yet flushed; and
subtracting the determined net CoFW reservation from a total amount of free memory, yielding the amount of memory of the computerized data storage system available for storing buffers; and
comparing the calculated amount of memory of the computerized data storage system available for storing buffers to the threshold amount, the threshold amount being a threshold percentage of total system memory.

18. The computer program product of claim 15,
wherein copying the block-aligned data of that write request into the file-specific ordered list of buffers includes:
performing a looped operation, wherein performing the looped operation includes, for each block-aligned page of that write request, starting with a block-aligned page corresponding to an initial address of the contiguous region and proceeding with consecutively-addressed block-aligned pages of that write request:
copying data of that block-aligned page into a buffer; and
inserting that buffer onto a tail of a temporary list of buffers specific to that write request;
subsequent to performing the looped operation, obtaining a lock on the file of that write request; and
subsequent to obtaining the lock, merging the temporary list of buffers into the file-specific ordered list of buffers; and
wherein the instructions, when executed by the computerized data storage system, further cause the computerized data storage system to efficiently process the write request received from the remote host by, subsequent to sending the acknowledgment of completion of that write request back to the remote host, releasing the lock on the file of that write request.

* * * * *